United States Patent [19]
Okada et al.

[11] Patent Number: 5,418,275
[45] Date of Patent: May 23, 1995

[54] POLYSTYRENE COMPOSITION

[75] Inventors: Akihiko Okada; Nobuyuki Sato, both of Ichihara, Japan

[73] Assignee: Idemitsu Kosan Co., Ltd., Tokyo, Japan

[21] Appl. No.: 118,335

[22] Filed: Sep. 9, 1993

[30] Foreign Application Priority Data

Sep. 10, 1992 [JP] Japan .................. 4-241581

[51] Int. Cl.⁶ .................. C08L 51/04; C08L 73/00; C08L 25/06; C08L 71/12
[52] U.S. Cl. .................. 524/504; 524/505; 524/508; 524/575; 524/577; 525/68; 525/92 A; 525/132; 525/133
[58] Field of Search ............ 524/502, 504, 505, 508, 524/575, 577; 525/68, 92, 132, 133

[56] References Cited

U.S. PATENT DOCUMENTS

| | | | |
|---|---|---|---|
| 5,109,068 | 4/1992 | Yamasaki et al. | 525/68 |
| 5,165,990 | 11/1992 | Nakano | 525/132 |
| 5,183,871 | 2/1993 | Yamasaki et al. | 524/577 |
| 5,202,454 | 4/1993 | Nakano | 524/451 |
| 5,219,940 | 6/1993 | Nakano | 525/133 |

FOREIGN PATENT DOCUMENTS 0356857  3/1990  European Pat. Off. .
0546497  6/1993  European Pat. Off. .

*Primary Examiner*—Peter A. Szekely
*Attorney, Agent, or Firm*—Oblon, Spivak, McClelland, Maier & Neustadt

[57] ABSTRACT

There are disclosed a polystyrene composition which comprises 100 parts by weight of a syndiotactic polystyrene (SPS)(a) and 1 to 100 parts by weight of a high molecular compound comprising 5 to 95% by weight of polyphenylene ether (PPO) and/or modified PPO and 95 to 5% by weight of a rubbery elastomer (b) and optionally, 1 to 350 parts by weight of an inorganic filler (d) and also a polystyrene composition which comprises 100 parts by weight of the component (a), 0.1 to 30 parts by weight of the component (b) and 1 to 100 parts by weight of a rubbery elastomer (c) and optionally, 1 to 350 parts by weight of the component (d). The above compositions are greatly improved in impact resistance, elongation and retention of physical properties during recycling without detriment to heat resistance and modulus of elasticity.

10 Claims, No Drawings

POLYSTYRENE COMPOSITION

BACKGROUND OF THE INVENTION

1. Field of the Invention

The present invention relates to a novel polystyrene composition. More particularly, it pertains to a syndiotactic polystyrene composition which is greatly improved in impact resistance, elongation retention of physical properties during recyling without detriment to heat resistance and modulus of elasticity.

2. Description of Related Arts

A styrenic polymer having syndiotactic configuration (SPS) is excellent in heat resistance and chemical resistance but is poor in impact resistance and therefore, it has heretofore suffered the disadvantage that it is inevitably limited in the scope of application as a construction material. In order to solve the above-mentioned problem, attempts have been made to improve the impact resistance of SPS, for example, by blending a rubbery elastomer and/or other thermoplastic resin with SPS. (Refer to Japanese Patent Application Laid-Open Nos. 257950/1987, 146944/1989, 182344/1989, 279944/1989 and 64140/1990).

In particular, Japanese Patent Application Laid-Open No. 146944/1989 proposes the use of a styrenic compound as a component and as a rubbery elastomer and Japanese Patent Application Laid-Open No. 279944/1989 proposes the addition of a block or graft copolymer containing atactic poly-styrene chain as a compatibilizer to a SPS/rubber composition.

However, since there is used in the above-proposed composition a rubbery component itself or a block or graft copolymer containing atactic polystyrene chain as a compatibilizer for the purpose of improving the compatibility between inherently incompatible SPS and the rubbery component and enhancing the dispersibility and interfacial strength of the rubbery component, the problem still remains unsolved in that the working effect as the compatibilizer is insufficient resulting in slight enhancement of impact resistance. On the other hand, the addition of a large amount of the rubbery component or the compatibilizer containing atactic polystyrene chain for the purpose of sufficiently enhancing the impact resistance brings about a problem that the heat resistance and modulus of elasticity of the resultant composition are inevitably lowered to a great extent.

SUMMARY OF THE INVENTION

The object of the present invention under such circumstances is to provide a polystyrene composition which is remarkably improved in its impact resistance and elongation without detriment to its heat resistance and modulus of elasticity and also well suited to be molded into industrial materials such as electric and electronic materials, industrial construction materials, car parts, domestic electrical appliances and various mechanical parts.

In view of the above, intensive research and investigation were continued by the present inventors in order to develop a polystyrene composition provided with the aforesaid favorable properties. As a result, it has been found by the present inventors that a syndiotactic polystyrene composition which is greatly improved in impact resistance, elongation and retention of physical properties during recycling without detriment to heat resistance and modulus of elasticity is obtained by preparing in advance a graft copolymer comprising a polyphenylene ether (PPO) and a rubbery elastomer and then blending it with SPS or by forming a high molecular compound comprising a PPO and a rubbery elastomer while being blended with SPS. The above-mentioned graft copolymer is usable as a compatibilizer between SPS and the rubbery elastomer. A syndiotactic polystyrene composition which is greatly improved in impact resistance, elongation/and retention of physical properties during recycling without detriment to heat resistance and modulus of elasticity is obtained by employing PPO compatibilized with SPS and a rubber component compatibilized with a rubbery elastomer, which rubber component is highly compatible with the rubbery elastomer in a small amount, when the aforesaid composition is compared with a compound obtained by simply blending SPS with a rubbery elastomer; and that by compounding an inorganic filler with the foregoing impact-resistant syndiotactic polystyrene composition, there is obtained a resin composition which is increased in modulus of elasticity and heat distortion temperature and, as compared with a resin composition not compounded with the above-mentioned graft copolymer, is remarkably improved in impact strength and elongation. The present invention has been accomplished on the basis of the aforesaid finding and information.

Specifically, the first aspect of the present invention provides a polystyrene composition which comprises 100 parts by weight of a styrenic polymer having syndiotactic configuration (a) and 1 to 100 parts by weight of a graft copolymer comprising 5 to 95% by weight of polyphenylene ether (PPO) and/or a modified PPO and 95 to 5% by weight of a rubbery elastomer (b), said components (a) and (b) being blended with each other. The second aspect thereof provides a polystyrene composition which comprises 100 parts by weight of the component (a), 0.1 to 30 parts by weight of the component (b) and 1 to 100 parts by weight of a rubbery elastomer (c), said components (a), (b) and (c) being blended with each other. The third aspect thereof provides a polystyrene composition which comprises 100 parts by weight of the component (a), 1 to 100 parts by weight of the component (b) and 1 to 350 parts by weight of an inorganic filler (d), said components (a), (b) and (d) being blended with each other. The fourth aspect thereof provides a polystyrene composition which comprises 100 parts by weight of the component (a), 0.1 to 30 parts by weight of the component (b), 1 to 100 parts by weight of the component (c) and 1 to 350 parts by weight of the component (d), said components (a), (b), (c) and (d) being blended with each other, In the composition according to the present invention, a styrenic polymer having syndiotactic configuration is employed as the component (a).

DESCRIPTION OF PREFERRED EMBODIMENT

Here, the styrenic polymer which has syndiotactic configuration means that its stereochemical structure is of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained is deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

In the composition according to the present invention, there is used as the component (b) a graft copolymer comprising 5 to 95% by weight of PPO and/or a modified PPO and 95 to 5% by weight of a rubbery elastomer. The PPO in the high molecular compound is a publicly known compound in itself, and for using the compound for the aforesaid purpose, reference may be made to USP. Nos. 3306874, 3306875, 3257357 and 3257358. The PPO is prepared usually by oxidative coupling reaction forming a homopolymer or a copolymer in the presence of a cupramine complex and at least one di-or tri-substituted phenol. As the cupramine complex there may be used the cupramine complex derived from any of primary, secondary and tertiary amines.

Specific examples of the suitable PPO include poly(2,3-dimethyl-6-ethyl-1,4-phenylene ether),
poly(2-methyl-6-chloromethyl-1,4-phenylene ether),
poly(2-methyl-6-hydroxyethyl-1,4-phenylene ether),
poly(2-methyl-6-n-butyl-1,4-phenylene ether),
poly(2-ethyl-6-isopropyl-4-phenylene ether),
poly(2-ethyl-6-n-propyl-1,4-phenylene ether),
poly(2,3,6-trimethyl-1,4-phenylene ether),
poly[2-(4'-methylphenyl)1,4-phenylene ether],
poly(2-bromo-6-phenyl-1,4-phenylene ether),
poly(2-methyl-6-phenyl-1,4-phenylene ether),
poly(2-phenyl-1,4-phenylene ether),
poly(2-chloro-1,4-phenylene ether),
poly(2-methyl-1,4-phenylene ether),
poly(2-chloro-6-ethyl-1,4-phenylene ether),
poly(2-chloro-6-bromo-1,4-phenylene ether),
poly(2,6-di-n-propyl-1,4-phenylene ether),
poly(2-methyl-6-isopropyl-1,4-phenylene ether),
poly(2-chloro-6-methyl-1,4-phenylene ether),
poly(2-methyl-6-ethyl-1,4-phenylene ether),
poly(2,6-dibromo-1,4-phenylene ether),
poly(2,6-dichloro-1,4-phenylene ether),
poly(2,6-diethyl-1,4-phenylene ether) and poly(2,6-dimethyl-1,4-phenylene ether).

Other suitable examples of the PPO include a copolymer derived form at least two phenolic compounds that are used for the preparation of the above-mentioned homopolymer and a graft copolymer or a block copolymer of an aromatic vinyl compound such as polystyrene and the aforestated polyphenylene ether. Among the above-mentioned PPO, poly(2,6-dimethyl-1,4-phenylene ether) is particularly desirable for use.

The modified PPO is obtained by modifying the above-mentioned PPO by the use of a modifier.

As the modifier used for modifying the PPO, there is used a compound having an etylenic double bond and a polar group in the same molecule, which is specifically exemplified by maleic anhydride, maleic acid, maleic acid ester, maleimide, N-substituted compound thereof, acrylic acid, acrylic acid ester, methacrylic acid, metacrylic acid ester and glycidyl methacrylate, among which is preferably used maleic anhydride in particular.

The maleic anhydride-modified PPO is obtained by reacting the PPO with maleic anhydride in the presence or absence of a solvent and an other type of resin in the presence of a radical generating agent. The modification is carried out by means of a known method, preferably by the use of an extruder in molten state.

Examples of the rubbery elastomer to be used for the reaction between the PPO and/or the modified PPO include natural rubber, polybutadiene, polyisoprene, polyisobutyrene, neoprene, polysulfide rubber, thiokol rubber, acrylic rubber, urethane rubber, silicone rubber, epichlorohydrin rubber, styrene/butadiene block copolymer (SBR), a styrene/butadiene/styrene block copolymer (SBS), hydrogenated styrene/butadiene/styrene block copolymer (SEBS), styrene/isoprene block/styrene block copolymer (SIS), hydrogenated styrene/isoprene block/styrene block copolymer (SEPS), ethylene/propylene rubber (EPR), ethylene/propylene/diene rubber (EPDM) and modified rubbers therefrom.

Among the above-mentioned elastomers, SEBS, SBR, SBS, SEPS and SIS are preferably used in particular. In the case of employing modified PPO, a modified rubber is preferably used as a rubbery elastomer, among which are particularly desirable maleic anhydride-modified SEBS, maleic anhydride-modified EPR, epoxy group-modified SEBS and rubber-modified EPR. In the second and fourth aspects of the present invention, there is preferably used a rubbery elastomer in the component (b) which is the same as or compatible with the rubbery elastomer in the component (c).

The graft copolymer as the component (b) in the composition according to the present invention can be prepared by the reaction (1) among PPO/a rubbery elastomer/a crosslinking agent, (2) among a modified PPO/a modified rubber/a crosslinking agent, (3) between a modified PPO/a modified rubber, or the like.

The above-mentioned graft copolymer is obtained by reacting with a crosslinking agent in the presence or absence of a solvent another type of resin or by reacting the functional groups of a modified polymer directly or by the use of a crosslinking agent. The reaction is effected by means of a known method, preferably by the use of an extruder in molten state.

It is advantageous to prepare the component (b) in advance from the standpoint of the ease of the graft reaction. On the other hand, the objective polystyrene composition according to the present invention can be obtained by simultaneously melt-kneading SPS as the component (a) and each component which constitutes the component (b) in the first and the third aspects of the present invention, or each component which constitutes the component (a) or (b) and the rubbery elastomer as the component (c) in the second and fourth aspects thereof.

It is necessary in the first and third aspects of the present invention that 1 to 100 parts by weight of the component (b) be blended with 100 parts by weight of the component (a). An amount of the component (b) less than 1 part by weight results in failure to sufficiently exert the effect on improving impact resistance, whereas that more than 100 parts by weight will cause unfavorable decrease in the crystallinity and heat resistance of SPS due to the influence of the PPO or undesirable decrease in the modulus of elasticity and heat resistance of the composition due to the influence of the rubbery elastomer.

It is necessary in the second and fourth aspects of the present invention that 0.1 to 30 parts by weight of the component (b) be blended with 100 parts by weight of the component (a). An amount of the component (b) less than 0.1 part by weight results in failure to sufficiently exhibit the effect as the compatibilizer, whereas that more than 30 parts by weight will cause unfavorable decrease in the crystallinity and heat resistance of SPS due to the influence of the PPO and also disadvantage in the production cost of the composition.

The specific process for producing the component (b) is exemplified by but not limited to the following.

(1) Reaction among PPO/a rubbery elastomer/a crosslinking agent

The component (b) can be produced by adding usually 0.1 to 5 parts by weight of a known crosslinking agent to 100 parts by weight of the mixture of 5 to 95% by weight of a modified PPO and 95 to 5% by weight of a rubbery elastomer, while about 0.01 to 1 part by weight of a radical generating agent may be added to the reaction system to accelerate the reaction.

The usable crosslinking agent is exemplified by but not limited to sulfur, sulfur compounds such as tetrathiuram disulfide and multifunctional vinyl monomers such as divinylbenzene and trimethylolpropane trimethacrylate.

(2) Reaction among a modified PPO/a modified rubber/a crosslinking agent

The component (b) can be produced by adding usually 0.1 to 100 parts by weight of a multifunctional compound reactive with each of the functional groups to 100 parts by weight of the mixture of 5 to 95% by weight of a modified PPO and 95 to 5% by weight of a modified rubber.

The usable multifunctional compound is exemplified by but not limited to, provided that it is reactive with the functional groups of both the modified PPO and the modified rubber, polyfunctionalamines such as hexamethylenediamine and polyethyleneimine, polyfunctional amides such as ethylenebisamide, nylon oligomer and polyamide, dicarboxylic acid such as succinic acid and adipic acid, diol such as 1,4-butanediol, ethylene glycol and bisphenol A, glycidyl alcohol, amine acid, glycidyl ether of bisphenol A, etc.

(3) Reaction between a modified PPO/a modified rubber

The component (b) can be produced by reacting 5 to 95% by weight of a modified PPO with 95 to 5% by weight of a modified rubber.

The combination of functional groups of a modified PPO and a modified rubber is not limited provided that they are reactive with each other, and exemplified by the combination of an acid anhydride and an epoxy group or an amino group as a desirable one. A catalyst may be added to the reaction system to accelerate the reaction between the functional groups.

The above-mentioned combination is specifically exemplified by but not limited to the combination of maleic anhydride-modified PPO and an epoxy group-modified SEBS, an epoxy group-modified EPR, an amino group modified SEBS or an amino group-modified EPR and that of an epoxy group-modified PPO and a maleic anhydride-modified SEBS or a maleic anhydride-modified EPR.

In the second and fourth aspects of the present invention, the component (b) is employed for the purpose of the compatibilizer and a rubbery elastomer is blended as the component (c) to improve impact resistance.

Examples of the rubbery elastomer include natural rubber, polybutadiene, polyisoprene, polyisobutyrene, neoprene, polysulfide rubber, thiokol rubber, acrylic rubber, urethane rubber, silicone rubber, epichlorohydrin rubber, styrene/butadiene block copolymer (SBR), styren/butadiene/styrene block copolymer (SBS), hydrogenated styrene/butadiene/styrene block copolymer (SEBS), styrene/isoprene block/styrene block copolymer (SIS), hydrogenated styrene/isoprene block/styrene block copolymer (SEPS), ethylene/propyrene rubber (EPR), ethylene/propylene/diene rubber (EPDM) and modified rubbers therefrom.

Among the above-mentioned elastomers, SEBS, SBR, SBS, SEPS and SIS are preferably used in particular.

In the second and fourth aspects of the present invention, the rubbery elastomer as the component (c) is used in an amount of 1 to 100, preferably 5 to 80 parts by weight based on 100 parts by weight of the component (a). An amount thereof less than 1 parts by weight brings about insufficient effect on improving impact resistance, while that more than 100 parts by weight causes undesirable decrease in heat resistance and rigidity.

In the third and fourth aspect of the present invention, an inorganic filler is blended as the component (d). The inorganic filler may be in any of the forms including fiber, granule and powder.

Examples of fibrous filler include glass fiber, carbon fiber and whisker in the form of cloth, mat, bound and cut fiber, short fiber filament, wisker, etc. There is preferably used the bound and cut fiber having a length of 0.05 to 50 mm and a diameter of 5 to 20 μm.

Examples of granular or powdery filler include talc, carbon black, graphite, titanium oxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead.

Among the above-mentioned various inorganic fillers are particularly desirable glassy fillers including glass powder, glass flake, glass bead, glass filament, glass fiber, glass roving and glass mat.

The above-mentioned filler is preferably surface-treated. The coupling agent to be used for the surface treatment is to improve adhesion between the filler and resin, and may be optionally selected for use from the publicly known silane-based coupling agent and titanium-based coupling agent. Examples of the preferably usable coupling agents among them include aminosilane such as γ-aminopropyltrimethoxysilane, N-β-(aminoethyl)-γ-aminopropyltrimethoxysilane, glycidoxypropyltrimethoxysilane and β-(3,4-epoxycyclohexyl) ethyltrimethoxysilane, epoxysilane, isopropyltriaminoethyl titanate, etc.

In the third and fourth aspects of the present invention, the inorganic filler as the component (d) is blended in an amount of 1 to 350, preferably 5 to 200 parts by weight based on 100 part by weight of the component (a). An amount thereof less than 1 part by weight leads to failure to sufficiently exert the blending effect as a filler, whereas that more than 350 parts by weight gives rise to the disadvantage that the dispersibility thereof is worsened, thereby making it difficult to mold the composition.

The resin composition according to the present invention may be blended with, as desired, an additive such as antioxidant and nucleating agent or an other thermoplastic resin to the extent that the object of the present invention is not impaired. Further in the third and fourth aspects of the present invention, about 0.1 to 5 parts by weight of maleic anhydride-modified PPO or the like per 100 parts by weight of the component (a) may be blended in order to improve the adhesiveness between the inorganic filler as the component (d) and the resin.

The polystyrene composition thus prepared is characterized by the following.

In the first aspect of the present invention, the composition is markedly improved in impact strength and elongation by the use of the component (b) in place of the rubbery elastomer as compared with the binary system of SPS/rubbery elastomer. The component (b) also decreases the change in physical properties arising from kneading and molding conditions and deterioration of physical properties during recycling.

In the second aspect thereof, the composition is remarkably improved in impact resistance and elongation without detriment to heat resistance and modulus of elasticity by virtue of the use of the component (b) as the compatibilizer as compared with the simple blend of the components (a) and (c). In addition, the component (b) as the compatibilizer contributes to the economical efficiency due to the small usage thereof and decreases the change in physical properties arising from kneading and molding conditions as well as deterioration of physical properties during recycling.

In the third aspect thereof, the composition is improved in impact strength and elongation without considerable detriment to modulus of elasticity and heat distortion temperature by the addition of the component (b) as compared with the simple blend of the components (a) and (d).

In the fourth aspect thereof, the composition is improved in impact strength and elongation without considerable detriment to modulus of elasticity and heat distortion temperature by the use of the component (b) as the compatibilizer as compared with the ternary system of the components (a), (c) and (d). Moreover, the component (b) as the compatibilizer contributes to the economical efficiency due to the small usage thereof.

In summary, the polystyrene composition according to the present invention is a syndiotactic polystyrene composition remarkably improved in impact resistance and elongation without detriment to heat resistance and modulus of elasticity, and is favorably used for molding industrial materials including electric and electronic materials such as connectors and print circuit board; industrial construction materials; automobile parts such as connectors to be mounted on vehicles, wheel cap and cylinder head cover; domestic electrical appliances, various machine parts, etc.

In the following, the present invention will be described in more detail with reference to examples and comparative examples, which however shall not be construed to limit the invention thereto.

"PPO" in the following Examples means poly(2,6-dimethyl-1,4-phenylene ether).

REFERENCE EXAMPLE 1

(Preparation of maleic anhydride-modified PPO)

100 Parts by weight of PPO(intrinsic viscosity of 0.45 in chloroform at 25° C.) and 3 parts by weight of maleic anhydride were dry-blended and melt kneaded by the use of a 30 mm twin-screw extruder at a revolution of 200 rpm at a temperature set to 300° C., while the resin temperature was about 330° C. The resultant strand was cooled and them pelletized to produce maleic anhydride-modified PPO.

In order to measure the modification rate, 1 g of the resultant modified PPO was dissolved in chloroform and thereafter reprecipitated in methanol, and the recovered polymer was subjected to Soxhlet extraction using methanol and dried. The modification rate was determined from the intensity of carbonyl absorption in infrared (IR) absorption spectrum and by neutralizing titration.

The following Preparation Examples 1 to 15 relate to the preparation of the graft copolymer as the component (b).

PREPARATION EXAMPLE 1

50 parts by weight of PPO (intrinsic viscosity of 0.45 in chloroform at 25° C.), 50 parts by weight of SEBS (produced by Shell Chem. Co. under the tradename "Kraton G-1651") and 1 part by weight of 2,3-dimethyl-2,3-diphenylbutane (produced by Nippon Oil & Fat Co., Ltd. under the tradename "NOPHMER BC") as the radical generating agent were dry-blended and melt kneaded by the use of a 30 mm twin-screw extruder at a revolution of 200 rpm at a temperature set to 300° C.

The resultant strand was cooled and then pelletized to produce SEBS/PPO graft copolymer. The resultant copolymer was subjected to Soxhlet extraction using hexane as the solvent to remove the residual SEBS and was dried. The graft copolymerization of SEBS and PPO was confirmed by the weight of the hexane-insoluble portion and $^1$H-NMR analysis.

PREPARATION EXAMPLES 2 to 15

The procedure in Preparation Example 1 was repeated except that the kinds of PPO and rubbery elastomers, PPO/rubbery elastomer ratio, and the kinds and amounts of crosslinking agents and radical generating agents were altered as given in Table 1.

phenyl)pentaerythritol diphosphite (produced by Adeka Argus Co., Ltd. under the tradename "PEP-36") as an antioxidant and 0.1 part by weight of tetrakis [methylene-3-(3′,5′-di-tert-butyl-4′-hydroxy-phenyl)] propionate (produced by Adeka Argus Co. Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 2.

EXAMPLES 2–8

The procedure in Example 1 was repeated except that

TABLE 1

|  | PPO or modified PPO | | Rubbly elastomer | | Others (crosslinking agent, radical generating agent) | |
| --- | --- | --- | --- | --- | --- | --- |
|  | Kind | Part/s by weight | kind | Part/s by weight | kind | Part/s by weight |
| Preparation Example 1 | PPO | 50 | G-1651[1] | 50 | NOPHMER BC[7] | 1 |
| Preparation Example 2 | PPO | 10 | G-1651 | 90 | maleic anhydride<br>NOPHMER BC | 1<br>0.1 |
| Preparation Example 3 | PPO | 50 | G-1651 | 50 | maleic anhydride<br>NOPHMER BC | 3<br>1 |
| Preparation Example 4 | PPO | 10 | NS-312S[2] | 90 | NOPHMER BC | 0.1 |
| Preparation Example 5 | PPO | 50 | NS-312S | 50 | NOPHMER BC | 0.1 |
| Preparation Example 6 | Reference Example 1 | 50 | M-1911[3] | 50 | hexamethylenediamine | 0.5 |
| Preparation Example 7 | Reference Example 1 | 10 | M-1913[4] | 90 | EPICHLON-50[8] | 0.5 |
| Preparation Example 8 | Reference Example 1 | 50 | M-1913 | 50 | EPICHLON-50 | 0.5 |
| Preparation Example 9 | Reference Example 1 | 10 | T-7711SP[5] | 90 | hexamethylenediamine | 0.5 |
| Preparation Example 10 | Reference Example 1 | 50 | T-7711SP | 50 | hexamethylenediamine | 0.5 |
| Preparation Example 11 | Reference Example 1 | 10 | Z-513[6] | 90 | none | — |
| Preparation Example 12 | Reference Example 1 | 30 | Z-513 | 70 | none | — |
| Preparation Example 13 | Reference Example 1 | 50 | Z-513 | 50 | none | — |
| Preparation Example 14 | Reference Example 1 | 10 | NS-312S | 90 | none | — |
| Preparation Example 15 | Reference Example 1 | 50 | NS-312S | 50 | none | — |

Remarks
[1] SEBS produced by Shell Chem. Co.
[2] SBR produced by Nippon Zeon Co., Ltd.
[3] maleic anhydride-modified SEBS produced by Asahi Chemical Industry Co., Ltd.
[4] maleic anhydride-modified SEBS produced by Asahi Chemical Industry Co., Ltd.
[5] maleic anhydride-modified EPR produced by Japan Synthetic Rubber Co., Ltd.
[6] epoxy group-modified SEBS produced by Asahi Chemical Industry Co., Ltd.
[7] 2,3-dimethyl-2,3-diphenylbutane produced by Nippon Oil & Fat Co., Ltd.
[8] Epoxy resin, type bisphenol A produced by Dainippon Ink & Chemicals, Inc.
[9] oligo amide produced by Kyoeishia Chemical Co., Ltd.

EXAMPLE 1

To 100 parts by weight of syndiotactic polystyrene (SPS, weight-average molecular weight of 305,000, weight-average molecular weight Mw/number-average molecular weight Mn of 2.35) were added, 27.8 parts by weight of the graft copolymer which had been prepared in Preparation Example 2 as the component (b); 1 part by weight of p-(tert-butyl)aluminum benzoate (produced by Dainippon ink & Chemicals, Inc. under the tradename "PTBBA-A1") as the nucleating agent; 0.1 part by weight of (2,6-di-tert-butyl-4-methylthe kinds and amounts of the graft copolymer were altered as given in Table 2. The result are given in Table 2.

EXAMPLE 9

To 100 parts by weight of syndiotactic polystyrene (SPS, weight-average molecular weight of 305,000, weight-average molecular weight Mw/number-average molecular weight Mn of 2.35) were added, as the component (b) the graft copolymer consisting of 3 parts by weight of the maleic anhydride-modified PPO which had been prepared in Reference Example 1, 25 parts by weight of maleic anhydride-modified SEBS (M-1913, produced by Asahi Chemical Industry Co., Ltd.) as the rubbery elastomer and 0.1 part by weight of epoxy resin, type bisphenol A (EPICHLON-50, produced by Dainippon Ink & Chemicals, Inc.); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity ad heat distortion temperature of the test pieces thus obtained. The results are given in Table 2.

EXAMPLE 10

The procedure in Example 9 was repeated except that the kinds and amounts of the rubbery elastomer were altered as given in Table 2. The result are given in Table 2.

COMPARATIVE EXAMPLES 1–9

The procedure in Example 1 was repeated except that the rubbery elastomers without PPO component were used in place of the graft copolymer in Examples 1–10, in respective kinds and amounts as given in Table 2. The results are given in Table 2.

As is clear from Table 2, the use of the high molecular compound comprising PPO and the rubbery elastomer in the objective SPS composition makes it possible to remarkably improve its impact strength and elongation without detriment to its modulus of elasticity and heat distortion temperature as compared with the rubbery elastomer alone without PPO. In addition, as is demonstrated in Examples 9 and 10, it is also possible to produce the objective impact-resisting resin composition by simultaneously kneading each of the components for preparing the components (a) and (b), respectively.

TABLE 2-1

| | (b) High molecular compound | | Izod impact strength with notch[1] (kj/m$^2$) | Elongation[2] (%) | Flexural modulus of elasticity[3] (MPa) | Heat distortion temperature[4] (°C.) |
|---|---|---|---|---|---|---|
| | kind | Amount added (part/s by weight) | | | | |
| Example 1 | Preparation Example 2 | 27.8 | 11.3 | 19.0 | 2450 | 125 |
| Example 2 | Preparation Example 2 | 12.3 | 6.3 | 9.4 | 3500 | 141 |
| Example 3 | Preparation Example 4 | 27.8 | 15.9 | 24.5 | 2350 | 126 |
| Example 4 | Preparation Example 7 | 27.8 | 14.5 | 20.0 | 2480 | 123 |
| Example 5 | Preparation Example 9 | 27.8 | 10.0 | 10.5 | 2130 | 118 |
| Example 6 | Preparation Example 11 | 27.8 | 15.5 | 20.1 | 2360 | 126 |
| Example 7 | Preparation Example 11 | 12.3 | 7.5 | 9.1 | 2550 | 138 |
| Example 8 | Preparation Example 14 | 27.8 | 17.1 | 25.8 | 2400 | 125 |
| Example 9 | M-1913 Reference Example 1 EPICHLON-50[8] | 25.0 3.0 0.1 | 13.0 | 17.1 | 2380 | 125 |
| Example 10 | Z-513 Reference Example 1 | 25.0 3.0 | 15.0 | 17.3 | 2410 | 128 |

TABLE 2-2

| | Rubbery elastomer | | Izod impact strength with notch[1] (kj/m$^2$) | Elongation[2] (%) | Flexural modulus of elasticity[3] (MPa) | Heat distortion temperature[4] (°C.) |
|---|---|---|---|---|---|---|
| | kind | Amount added (part/s by weight) | | | | |
| Comparative Example 1 | G-1651 | 25.0 | 5.2 | 11.1 | 2470 | 125 |
| Comparative Example 2 | G-1651 | 11.1 | 2.8 | 2.0 | 3580 | 140 |
| Comparative Example 3 | NS-312S | 25.0 | 8.5 | 15.0 | 2500 | 130 |
| Comparative Example 4 | M-1913 | 25.0 | 6.0 | 11.0 | 2520 | 131 |
| Comparative Example 5 | EP-912P | 25.0 | 3.9 | 6.9 | 2100 | 118 |
| Comparative Example 6 | EP-912P | 11.1 | 1.8 | 1.8 | 3150 | 133 |
| Comparative Example 7 | T-7711SP | 25.0 | 4.0 | 5.8 | 2150 | 120 |
| Comparative Example 8 | Z-513 | 25.0 | 5.8 | 13.8 | 2540 | 126 |

TABLE 2-2-continued

|  | Rubbery elastomer | | Izod impact strength with notch[1] (kj/m²) | Elongation[2] (%) | Flexural modulus of elasticity[3] (MPa) | Heat distortion temperature[4] (°C.) |
| --- | --- | --- | --- | --- | --- | --- |
|  | kind | Amount added (part/s by weight) | | | | |
| Comparative Example 9 | Z-513 | 11.1 | 3.0 | 5.3 | 3700 | 141 |

Remarks
[1] according to JIS K-7110
[2] according to JIS K-7113
[3] according to JIS K-7203
[4] according to JIS K-7207

EXAMPLE 11

To 100 parts by weight of syndiotactic polystyrene (SPS, weight-average molecular weight of 305,000, weight-average molecular weight Mw/number-average molecular weight Mn of 2.35) were added 5 parts by weight of the high molecular compound which had been prepared in Preparation Example 1 as the component (b); 22.5 parts by weight of SEBS (Kraton G-1651, produced by Shell Chem. Co.) as the rubbery elastomer (c); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co., Ltd, under the tradename "PEP-36") as an antioxidant and 0.1 part by weight of tetrakis [methylene-3-(3′,5′-di-tert-butyl-4′-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 3.

EXAMPLES 12–22

The procedure in Example 11 was repeated except that the kinds and amounts of the high molecular compounds (b) and rubbery elastomers (c) were altered as given in Table 5. The result are given in Table 3.

EXAMPLE 23

To 100 parts by weight of syndiotactic polystyrene (SPS, weight-average molecular weight of 305,000, weight-average molecular weight Mw/number-average molecular weight Mn of 2.35) were added, as the component (b), the high molecular compound consisting of 2.5 parts by weight of the maleic anhydride-modified PPO in Reference Example 1, 2.5 parts by weight of maleic anhydride-modified SEBS (M-1913, produced by Asahi Chemical Industry Co., Ltd.) as the rubbery elastomer and 0.1 part by weight of epoxy resin, type bisphenol A (EPICHLON-50, produced by Dainippon Ink & Chemicals, Inc.); 22.5 parts by weight of SEBS (Kraton G-1651, produced by Shell Chem. Co.) as the rubbery elastomer (c); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis [methylene-3-(3′,5′-di-tert-butyl-4′-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 3.

EXAMPLES 24 and 25

The procedure in Example 23 was repeated except that the kinds and amounts of the high molecular compounds were altered as given in Table 3. The results are given in Table 3.

As is clear from Table 3, the use of the high molecular compound as the compatibilizer comprising PPO and the rubbery elastomer in the objective SPS-based resin composition makes it possible to remarkably improve its impact strength and elongation without detriment to its modulus of elasticity and heat distortion temperature as compared with the rubbery elastomer alone without PPO as shown in Table 2 on the columns of Comparative Examples 1–9. In addition, as is demonstrated in Examples 23, 24 and 25 it is possible to produce the objective impact-resisting resin composition by simultaneously kneading each of the components for preparing the components (a) and (b), respectively.

TABLE 3-1

|  | (b) High molecular compound | | (c) Rubbery elastmer | |
| --- | --- | --- | --- | --- |
|  | Kind | Amount added (part/s by weight) | kind | Amount added (part/s by weight) |
| Example 11 | Preparation Example 1 | 5.0 | G-1651 | 22.5 |
| Example 12 | Preparation Example 3 | 5.0 | G-1651 | 22.5 |
| Example 13 | Preparation Example 15 | 5.0 | G-1651 | 22.5 |
| Example 14 | Preparation Example 5 | 5.0 | NS-312S | 22.5 |

TABLE 3-1-continued

| | (b) High molecular compound | | (c) Rubbery elastmer | |
|---|---|---|---|---|
| | Kind | Amount added (part/s by weight) | kind | Amount added (part/s by weight) |
| Example 15 | Preparation Example 5 | 5.0 | G-1651 | 22.5 |
| Example 16 | Preparation Example 6 | 5.0 | G-1651 | 22.5 |
| Example 17 | Preparation Example 8 | 5.0 | G-1651 | 22.5 |
| Example 18 | Preparation Example 10 | 5.0 | EP-912P | 22.5 |
| Example 19 | Preparation Example 10 | 2.0 | EP-912P | 10.1 |
| Example 20 | Preparation Example 10 | 5.0 | G-1651 | 22.5 |
| Example 21 | Preparation Example 12 | 5.0 | G-1651 | 21.5 |
| Example 22 | Preparation Example 13 | 5.0 | G-1651 | 22.5 |
| Example 23 | Reference Example 1<br>M-1913<br>EPICHLON-50[8] | 2.5<br>2.5<br>0.1 | G-1651 | 22.5 |
| Example 24 | Reference Example 1<br>Z-513 | 2.5<br>2.5 | G-1651 | 22.5 |
| Example 25 | Reference Example 1<br>M-1913<br>LIGHT AMIDE WH215[9] | 2.5<br>2.5<br>2.5 | G-1651 | 22.5 |

TABLE 3-2

| | Izod impact strength woth notch[1] (kj/m$^2$) | Elongation[2] (%) | Flexural modulus of elasticity[3] (MPa) | Heat distortion temperature[4] (°C.) |
|---|---|---|---|---|
| Example 11 | 10.0 | 20.0 | 2490 | 123 |
| Example 12 | 12.0 | 21.3 | 2450 | 125 |
| Example 13 | 13.0 | 18.5 | 2390 | 127 |
| Example 14 | 16.3 | 22.0 | 2380 | 125 |
| Example 15 | 15.1 | 18.9 | 2400 | 123 |
| Example 16 | 13.1 | 19.5 | 2450 | 128 |
| Example 17 | 13.9 | 21.2 | 2450 | 127 |
| Example 18 | 9.5 | 11.0 | 2150 | 115 |
| Example 19 | 5.3 | 6.2 | 3200 | 135 |
| Example 20 | 9.9 | 18.5 | 2390 | 121 |
| Example 21 | 15.1 | 23.6 | 2350 | 125 |
| Example 22 | 14.2 | 21.1 | 2400 | 126 |
| Example 23 | 10.1 | 17.8 | 2500 | 124 |
| Example 24 | 11.4 | 18.0 | 2470 | 127 |
| Example 25 | 13.0 | 18.5 | 2380 | 125 |

[1] according to JIS K-7110
[2] according to JIS K-7113
[3] according to JIS K-7203
[4] according to JIS K-7207

EXAMPLE 26

To 100 parts by weight of syndiotactic polystyrene (SPS, weight-average molecular weight of 305,000, weight-average molecular weight Mw/number-average molecular weight Mn of 2.35) were added, 27.8 parts by weight of the high molecular compound in Preparation Example 2 as the component (b); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLES 27–33

The procedure in Example 26 was repeated except that the kinds and amounts of the high molecular compounds were altered as given in Table 4. The result are given in Table 4.

EXAMPLE 34

To 100 parts by weight of syndiotactic polystyrene (SPS, weight-average molecular weight of 305,000, weight-average molecular weight Mw/number-average molecular weight Mn of 2.35) were added, as the component (b) the high molecular compound consisting of 3 parts by weight of the maleic anhydride-modified PPO which had been prepared in Reference Example 1,25 parts by weight of maleic anhydride-modified SEBS (M-1913, produced by Asahi Chemical Industry Co., Ltd.) as the rubbery elastomer and 0.1 part by weight of epoxy resin, type bisphenol A (EPICHLON-50, produced by Dainippon Ink & Chemicals, Inc.); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)]propionate (produced by Adeka Argus Co., Ltd. under the tradename "MARK A060") also as an antioxidant, and the resultant mixture was blended with a Henschel mixer. Subsequently the blend Was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLE 35

The procedure in Example 34 was repeated except that the kinds and amounts of the high molecular compound were altered as given in Table 4. The result are given in Table 4.

were used in place of the high molecular compounds in Example 26, in respective kinds and amounts as given in Table 4. The results are given in Table 4.

As is clear from Table 4, the use of the high molecular compound comprising PPO and the rubbery elastomer in the objective SPS composition makes it possible to remarkably improve its impact strength and elongation without detriment to its modulus of elasticity and heat distortion temperature as compared with the rubbery elastomer alone without PPO. In addition, as is demonstrated in Examples 34 and 35, it is possible to produce the objective impact-resisting resin composition by simultaneously kneading each of the components for preparing the components (a), (b) and (d), respectively.

TABLE 4-1

|  | (b) High molecular compound | | Izod impact strength with notch[1] (kj/m$^2$) | Elongation[2] (%) | Flexural modulus of elasticity[3] (MPa) | Heat distortion temperature[4] (°C.) |
|---|---|---|---|---|---|---|
|  | kind | Amount added (part/s by weight) |  |  |  |  |
| Example 26 | Preparation Example 2 | 27.8 | 16.3 | 3.8 | 7420 | 230 |
| Example 27 | Preparation Example 2 | 12.3 | 12.0 | 2.6 | 8640 | 241 |
| Example 28 | Preparation Example 4 | 27.8 | 16.0 | 3.7 | 7530 | 203 |
| Example 29 | Preparation Example 7 | 27.8 | 17.5 | 3.9 | 7500 | 231 |
| Example 30 | Preparation Example 9 | 27.8 | 11.1 | 1.9 | 7100 | 220 |
| Example 31 | Preparation Example 11 | 27.8 | 17.3 | 3.9 | 7480 | 234 |
| Example 32 | Preparation Example 11 | 12.3 | 12.9 | 2.8 | 8710 | 245 |
| Example 33 | Preparation Example 14 | 27.8 | 16.9 | 3.8 | 7560 | 229 |
| Example 34 | M-1913 Reference Example 1 EPICHLON-50[8] | 25.0 3.0 0.1 | 16.0 | 3.5 | 7550 | 233 |
| Example 35 | Z-513 Reference Example 1 | 25.0 3.0 | 16.9 | 3.7 | 7490 | 233 |

COMPARATIVE EXAMPLE 10–17

The procedure in Example 25 was repeated except that the rubbery elastomers without PPO component

TABLE 4-2

|  | Rubbery elastomer | | Izod impact strength with notch[1] (kj/m$^2$) | Elongation[2] (%) | Flexural modulus of elasticity[3] (MPa) | Heat distortion temperature[4] (°C.) |
|---|---|---|---|---|---|---|
|  | kind | Amount added (part/s by weight) |  |  |  |  |
| Comparative Example 10 | G-1651 | 25.0 | 6.2 | 1.3 | 7400 | 192 |
| Comparative Example 11 | G-1651 | 11.1 | 4.1 | 1.0 | 8600 | 221 |
| Comparative Example 12 | NS-312S | 25.0 | 6.8 | 1.5 | 7280 | 202 |
| Comparative Example 13 | NS-312S | 11.1 | 3.1 | 1.0 | 8710 | 222 |
| Comparative Example 14 | M-1913 | 25.0 | 6.0 | 1.4 | 7350 | 198 |
| Comparative Example 15 | T-7711SP | 25.0 | 4.3 | 1.2 | 7180 | 186 |
| Comparative Example 16 | Z-513 | 25.0 | 6.1 | 1.5 | 7450 | 198 |
| Comparative Example 17 | Z-513 | 11.1 | 4.8 | 1.3 | 8700 | 223 |

Remarks
[1] according to JIS K-7110
[2] according to JIS K-7113
[3] according to JIS K-7203
[4] according to JIS K-7207

EXAMPLE 36

To 100 parts by weight of syndiotactic polystyrene (SPS, weight-average molecular weight of 305,000, weight-average molecular weight Mw/number-average molecular weight Mn of 2.35) were added, 5 parts by weight of the high molecular compound in Preparation Example 1 as the component (b); 22.5 parts by weight of SEBS (Kraton G-1651, produced by Shell Chem. Co.) as the rubbery elastomer (c); 1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl) pentaerythritol diphosphite (produced by Adeka Argus Co, Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was incorporated with 43 parts by weight of glass fiber by side feeding, melt kneaded and pelletized with a twin-screw extruder. The pellet thus obtained was injection molded to produce test piece for tensile test, flexural test and Izod impact test, respectively. Measurements were made of Izod impact strength, elongation, modulus of elasticity and heat distortion temperature of the test pieces thus obtained. The results are given in Table 5.

EXAMPLES 37–47

The procedure in Example 36 was repeated except that the kinds and amounts of the high molecular compounds (b) and rubbery elastomers (c) were altered as given in Table 5. The result are given in Table 5.

EXAMPLE 48

To 100 parts by weight of syndiotactic polystyrene (SPS, weight-average molecular weight of 305,000 weight-average molecular weight Mw/number-average molecular weight Mn of 2.35) were added, as the component (b) the high molecular compound consisting of 2.5 parts by weight of the maleic anhydride-modified PPO in Reference Example 1, 2.5 parts by weight of maleic anhydride-modified SEBS (M-1913, produced by Asahi Chemical Industry Co., Ltd.) as the rubbery elastomer and 0.1 part by weight of epoxy resin, type bisphenol A (EPICHLON-50, produced by Dainippon Ink & Chemicals, Inc.); 22.5 parts by weight of SEBS (Kraton G-1651, produced by Shell Chem. Co.) as the rubbery elastomer (c); 0.1 part by weight of p-(tert-butyl)aluminum benzoate (produced by Dainippon Ink & Chemicals, Inc. under the tradename "PTBBA-A1") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antiosidant, and the resultant mixture was blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 5.

EXAMPLES 49 and 50

The procedure in Example 48 was repeated except that the kinds and amounts of the high molecular compounds were altered as given in Table 5. The results are given in Table 5.

As is clear from Table 5, the use of the high molecular compound as the compatibilizer comprising PPO and the rubbery elastomer in the objective SPS composition makes it possible to remarkably improve its impact strength and elongation without detriment to its modulus of elasticity and heat distortion temperature as compared with the rubbery elastomer alone without PPO as shown in Table 4 on the columns of Comparative Examples 10 to 17. In addition, as is demonstrated in Examples 47, 48 and 49 it is possible to produce the objective impact-resisting resin composition by simultaneously kneading each of the components for preparing the components (a), (b), (c) and (d), respectively.

TABLE 5-1

|  | (b) | | (c) | |
| --- | --- | --- | --- | --- |
|  | Kind | Amount added (part/s by weight) | kind | Amount added (part/s by weight) |
| Example 36 | Preparation Example 1 | 5.0 | G-1651 | 23.1 |
| Example 37 | Preparation Example 3 | 5.0 | G-1651 | 23.1 |
| Example 38 | Preparation Example 5 | 5.0 | NS-312S | 23.1 |
| Example 39 | Preparation Example 5 | 5.0 | G-1651 | 23.1 |
| Example 40 | Preparation Example 6 | 5.0 | G-1651 | 23.1 |
| Example 41 | Preparation Example 8 | 5.0 | G-1651 | 23.1 |
| Example 42 | Preparation Example 10 | 5.0 | EP-912P | 23.1 |
| Example 43 | Preparation Example 10 | 2.0 | EP-912P | 10.2 |
| Example 44 | Preparation Example 10 | 5.0 | G-1651 | 23.1 |
| Example 45 | Preparation Example 12 | 5.0 | G-1651 | 21.9 |
| Example 46 | Preparation Example 13 | 5.0 | G-1651 | 23.1 |

TABLE 5-1-continued

| | | (b) | | (c) |
|---|---|---|---|---|
| | Kind | Amount added (part/s by weight) | kind | Amount added (part/s by weight) |
| Example 47 | Preparation Example 15 | 5.0 | G-1651 | 21.9 |
| Example 48 | Reference Example 1 | 2.5 | G-1651 | 23.1 |
| | M-1913 | 2.5 | | |
| | EPICHLON-50[8] | 0.1 | | |
| Example 49 | Referemce Example 1 | 2.5 | G-1651 | 23.1 |
| | Z-513 | 2.5 | | |
| Example 50 | Reference Example 1 | 2.5 | G-1651 | 23.1 |
| | M-1913 | 2.5 | | |
| | LIGHT AMIDE WH215[9] | 2.5 | | |

TABLE 5-2

| | Izod impact strength woth notch[1] (kj/m$^2$) | Elongation[2] (%) | Flexural modulus of elasticity[3] (MPa) | Heat distortion temperature[4] (°C.) |
|---|---|---|---|---|
| Example 36 | 14.1 | 3.5 | 7410 | 200 |
| Example 37 | 16.2 | 3.6 | 7480 | 231 |
| Example 38 | 14.2 | 3.3 | 7450 | 205 |
| Example 39 | 13.1 | 3.2 | 7450 | 202 |
| Example 40 | 16.1 | 3.8 | 7500 | 233 |
| Example 41 | 16.2 | 3.8 | 7510 | 233 |
| Example 42 | 10.0 | 1.9 | 7100 | 219 |
| Example 43 | 7.3 | 1.5 | 8320 | 231 |
| Example 44 | 13.9 | 3.0 | 7440 | 230 |
| Example 45 | 16.1 | 3.7 | 7490 | 234 |
| Example 46 | 17.0 | 3.8 | 7500 | 235 |
| Example 47 | 16.5 | 3.7 | 7510 | 233 |
| Example 48 | 15.5 | 3.5 | 7470 | 230 |
| Example 49 | 15.2 | 3.4 | 7440 | 231 |
| Example 50 | 15.5 | 3.6 | 7390 | 229 |

[1] according to JIS K-7110
[2] according to JIS K-7113
[3] according to JIS K-7203
[4] according to JIS K-7207

EXAMPLE 51

The Izod impact test pieces which had been prepared in Example 1 were crushed into small pieces, Which were again made into test pieces to measure the dynamical properties thereof. The results are given in Table 6.

EXAMPLES 52-54 and COMPARATIVE EXAMPLES 18-20

The procedure in Example 24 was repeated except that there were used the Izod impact test pieces as shown in Table 6 on the columns of Examples 6, 12 and 21 and those of Comparative Examples 1, 3 and 12, respectively. The results are given in Table 6.

As can be seen from Table 6, the resin composition of the present invention comprising the high molecular compound consisting essentially of PPO and the rubbery elastomer is not considerably deteriorated in physical properties owing to recycling, thus making itself practically useful.

TABLE 6

| | Test piece used | Change in Izod impact strength with the number of recycles (KJ/m$^2$)[1] | | | | |
|---|---|---|---|---|---|---|
| | | once | twice | thrice | four times | five times |
| Example 51 | Example 1 | 11.3 | 10.6 | 9.8 | 9.0 | 8.8 |
| Example 52 | Example 6 | 15.5 | 14.2 | 13.0 | 12.1 | 11.7 |
| Example 53 | Example 12 | 12.0 | 10.8 | 9.6 | 8.9 | 8.7 |
| Example 54 | Example 21 | 14.2 | 12.7 | 11.4 | 10.4 | 10.0 |
| Comparative Example 18 | Comparative Example 1 | 5.2 | 3.2 | 2.4 | 2.1 | 1.8 |
| Comparative Example 19 | Comparative Example 3 | 6.4 | 4.8 | 3.7 | 2.8 | 2.3 |
| Comparative Example 20 | Comparative Example 2 | 5.8 | 3.8 | 3.0 | 2.5 | 2.3 |

[1] according to JIS K-7110

What is claimed is:

1. A polystyrene composition which comprises 100 parts by weight of a styrenic polymer having syndiotactic configuration (a) and 1 to 100 parts by weight of a graft copolymer comprising a reaction product of 5 to 95% by weight of at least one member selected from the group consisting of polyphenylene ether and modified polyphenylene ether and 95 to 5% by weight of a rubbery elastomer (b), said components (a) and (b) being blended with each other.

2. A polystyrene composition which comprises 100 parts by weight of a styrenic polymer having syndiotactic configuration (a), 0.1 to 30 parts by weight of a graft copolymer comprising a reaction product of 5 to 95% by weight of at least one member selected from the group consisting of polyphenylene ether and modified polyphenylene ether and 95 to 5% by weight of a rubbery elastomer (b) and 1 to 100 parts by weight of a rubbery elastomer (c), said components (a), (b) and (c) being blended with each other.

3. A polystyrene composition which comprises 100 parts by weight of a styrenic polymer having syndiotactic configuration (a), 1 to 100 parts by weight of a graft copolymer comprising a reaction product of 5 to 95% by weight of at least one member selected from the group consisting of polyphenylene ether and modified polyphenylene ether and 95 to 5% by weight of a rubbery elastomer (b) and 1 to 350 parts by weight of an inorganic filler (d), said components (a), (b) and (d) being blended with each other.

4. A polystyrene composition which comprises 100 parts by weight of a styrenic polymer having syndiotactic configuration (a), 0.1 to 30 parts by weight of a graft copolymer comprising a reaction product of 5 to 95% by weight of at least one member selected from the group consisting of polyphenylene ether and modified polyphenylene ether and 95 to 5% by weight of a rubbery elastomer (b), 1 to 100 parts by weight of a rubbery elastomer (c) and 1 to 350 parts by weight of an inorganic filler (d), said components (a), (b), (c) and (d) being blended with each other.

5. The composition according to claim 1 wherein the rubbery elastomer in the component (b) is selected from the group consisting of hydrogenated styrene/butadiene/styrene copolymer rubber (SEBS), styrene/butadiene/styrene copolymer rubber (SBS), styrene/butadiene copolymer rubber (SBR), ethylene/propylene copolymer rubber (EPR) and modified rubbers therefrom.

6. The composition according to claim 2 wherein the rubbery elastomer in the component (b) is selected from the group consisting of SEBS, SBS, SBR, EPR and modified rubbers therefrom.

7. The composition according to claim 3 wherein the rubbery elastomer in the component (b) is selected from the group consisting of SEBS, SBS, SBR, EPR and modified rubbers therefrom.

8. The composition according to claim 4 wherein the rubbery elastomer in the component (b) is selected from the group consisting of SEBS, SBS, SBR, EPR and modified rubbers therefrom.

9. The composition according to claim 2 wherein the rubbery elastomer as the component (c) is selected from the group consisting of SEBS, SBS, SBR and EPR.

10. The composition according to claim 4 wherein the rubbery elastomer as the component (c) is selected from the group consisting of SEBS, SBS, SBR and EPR.

* * * * *